United States Patent [19]

Allison

[11] Patent Number: 4,525,367
[45] Date of Patent: Jun. 25, 1985

[54] METHOD FOR PREPARING AN EXPANDED FOOD PRODUCT

[76] Inventor: George E. Allison, 1101 New Hampshire Ave., NW., Washington, D.C. 20037

[21] Appl. No.: 547,913

[22] Filed: Nov. 2, 1983

Related U.S. Application Data

[63] Continuation of Ser. No. 298,872, Sep. 2, 1981, abandoned, which is a continuation-in-part of Ser. No. 63,243, Aug. 3, 1979, abandoned.

[51] Int. Cl.³ ............................................. A23L 1/18
[52] U.S. Cl. .................... 426/394; 426/407; 426/445; 426/446; 426/450; 426/625; 426/138; 426/113; 426/115; 426/118; 426/395; 426/111; 426/124; 426/396; 426/411
[58] Field of Search ............... 426/445, 446, 447, 448, 426/449, 450, 113, 118, 115, 394, 111, 412, 621, 625, 407, 138, 395, 124, 396, 411; 99/323.4; 131/140 P; 249/61, 62; 425/DIG. 12; 220/207; 229/DIG. 14

[56] References Cited

U.S. PATENT DOCUMENTS

| | | | |
|---|---|---|---|
| 211,859 | 2/1879 | Manley | 99/440 |
| 707,892 | 8/1902 | Anderson | 426/449 |
| 766,212 | 8/1904 | Anderson | 131/140 P |
| 874,279 | 12/1907 | Anderson | 426/446 |
| 2,156,022 | 4/1939 | McFaul | |
| 2,226,844 | 12/1940 | Carr | 249/120 |
| 2,633,284 | 3/1953 | Moffett et al. | 426/118 |
| 2,653,098 | 9/1953 | Baer | 426/621 |
| 2,671,424 | 3/1954 | Herring et al. | 206/219 |
| 2,673,806 | 3/1954 | Colman | |
| 2,954,295 | 9/1960 | Clausi et al. | 426/621 |
| 2,954,296 | 9/1960 | Clausi et al. | |
| 3,057,739 | 10/1962 | Forkner | 426/445 |
| 3,076,711 | 2/1963 | D'Arnaud | |
| 3,296,822 | 1/1967 | Gram | 249/121 |
| 3,386,837 | 6/1968 | Arnot | 426/115 |
| 3,513,886 | 5/1970 | Easter et al. | 426/115 |
| 3,519,439 | 7/1970 | Dunn | 426/111 |
| 3,635,261 | 1/1972 | Morane et al. | 141/3 |
| 3,692,537 | 9/1972 | D'Arnaud | |
| 3,753,729 | 8/1973 | Harms et al. | 426/625 |
| 3,779,772 | 12/1973 | Forkner | 426/446 |
| 3,791,285 | 2/1974 | Mack | 99/440 |
| 3,873,738 | 3/1975 | Zoeller et al. | 426/111 |
| 3,918,610 | 11/1975 | Willis | 220/207 |
| 3,973,045 | 8/1976 | Brandberg | 426/111 |
| 3,981,433 | 9/1976 | Thornhill | 426/128 |
| 3,997,677 | 12/1976 | Hirsch et al. | 426/118 |
| 4,022,918 | 5/1977 | Miller | 426/446 |
| 4,051,162 | 9/1977 | Rose | 426/446 |
| 4,068,007 | 1/1978 | Forkner | 426/445 |
| 4,091,632 | 5/1978 | Marchewka et al. | 249/61 |
| 4,259,359 | 3/1981 | Spicer | 426/625 |
| 4,292,332 | 9/1981 | McHam | 426/118 |

FOREIGN PATENT DOCUMENTS 0023799 2/1981 European Pat. Off. ............ 426/447
1933393 4/1970 Fed. Rep. of Germany .

OTHER PUBLICATIONS

Elements of Food Technology—Desrosier AVI Publ. Co., 1977.
Chemistry & Technology of Cereals as Food & Feed Matr., AVI Publ., 1959.

Primary Examiner—Steven Weinstein
Attorney, Agent, or Firm—Hammond & Littell, Weissenberger & Dippert

[57] ABSTRACT

This invention relates to an apparatus for preparing vapor-burst, non-fat-fried fast food comprising a confining means comprised of two or more cooperating surfaces which are joined together to form said confining means and containing a suitable water-containing, expandable mixture substantially filling said confining means, whereby the confining means is capable upon heating of rupturing due to increased vapor pressure of liquid in the expandable mixture to permit the expandable mixture to suddenly expand through the ruptured area.

13 Claims, 7 Drawing Figures

METHOD FOR PREPARING AN EXPANDED FOOD PRODUCT

CROSS-REFERENCE TO RELATED APPLICATION

This application is a continuation of co-pending U.S. patent application Ser. No. 298,872, filed Sept. 2, 1981, now abandoned, which in turn is a continuation-in-part of U.S. patent application Ser. No. 63,243, filed Aug. 3, 1979, now abandoned.

BACKGROUND OF THE INVENTION

A number of crispy, fat-fried food products have been developed as snack foods. However, these fat-fried products normally contain significant amounts of fat. For example, potato chips can have a fat content as high as 40%. Foods containing a large amount of fat require careful storage and the use of anti-oxidants to avoid having the product turn rancid upon contact with the atmosphere. In addition, a large amount of fat is a detriment in that it contributes a large amount of calories and diet-conscious people tend to avoid the use of such high-calorie-containing materials.

U.S. Pat. No. 2,863,770, incorporated herein by reference, describes a food product derived from edible tubers, such as potatoes, which is extruded under pressure and fried to give a crisp expanded product having the taste and aroma of a fried potato product, such as potato chips. More specifically, a pre-swelled potato flour containing between 30 and 40% water is extruded into strands. The strands are dried to a moisture content of between 6 and 10%. The dried strands are cut into piecelets, and the piecelets are fried in hot fat.

The frying expands the piecelets to about five times their original volume. U.S. Pat. Nos. 3,076,711 and 3,131,063, both incorporated herein by reference, are directed to related processes.

In U.S. Pat. No. 3,692,537, incorporated herein by reference, there is described a method of producing an expanded fried potato product from potato flour in which sugar content and the water-binding property can be simply and uniformly controlled. However, the resulting product is still a fat-fried product having the disadvantages discussed above.

OBJECTS OF THE INVENTION

It is an object of this invention to provide an improved process for the production of an expanded foodstuff.

It is another object of the invention to provide a novel process for the production of an expanded foodstuff that is not fat-fried.

Further, it is an object of this invention to produce a new and wide variety of low-cost food that will be nutritious, filling and delicious, will come in attractive flavors and colors, and will be easy, quick, and fun to prepare. These and other objects of the invention will become obvious from the following detailed description.

DETAILED DESCRIPTION OF THE INVENTION

Figure 1:
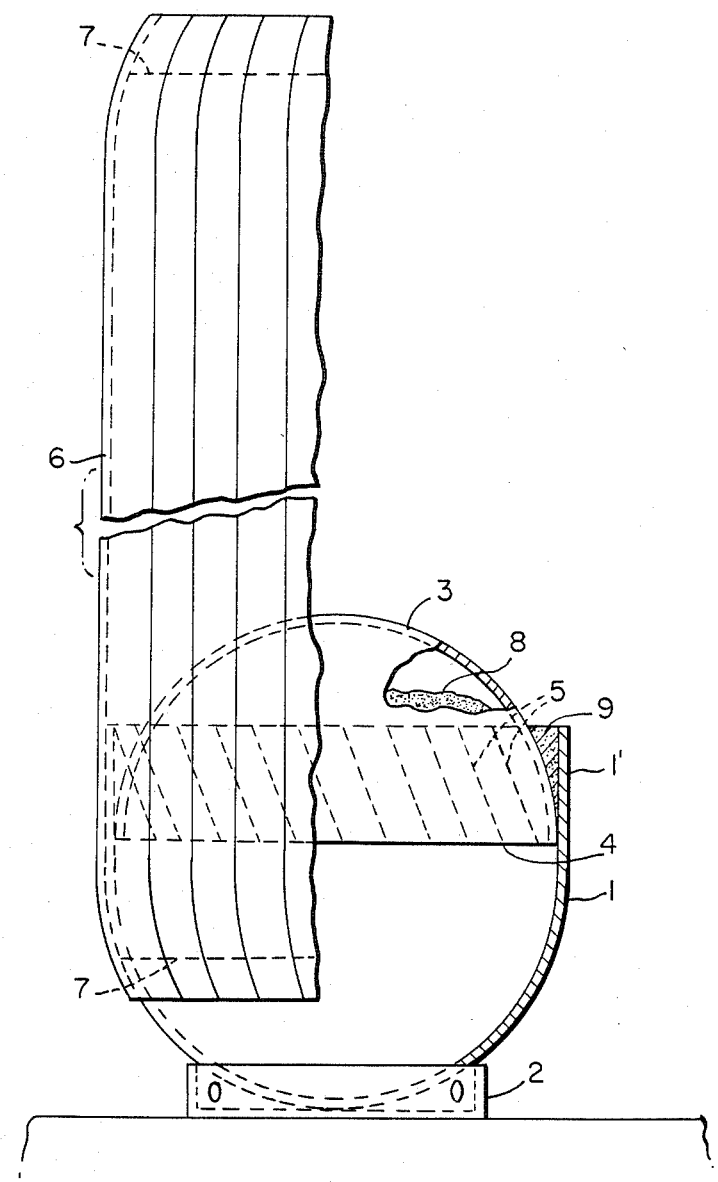
FIG. 1 represents one embodiment of a confining means useful according to this invention, including a sectional aspect of a receiving means.

This invention is directed to a process of providing crispy, snack-like foods that are not fat-fried. The basic principle of operation is not unlike that of heating corn kernels to produce popcorn. In the case of popcorn, sufficient energy is added—by means of, for example, heated oil or hot air—to somewhat moist edible material contained within a hard-strong natural skin to raise the interior temperature and vapor pressure. When the vapor pressure exceeds the tensile strength of the kernel skin, the skin bursts, yielding expanded "popcorn" food.

According to the process of the invention, a suitable mixture of moist edible ingredients contained in a confining means is caused to undergo sudden expansion by adding to the mixture sufficient energy to cause the ingredients to burst from the confining means when a bursting pressure is achieved. The confining means comprises two or more cooperating surfaces which fit together to form said confining means and contain a suitable, water-containing, expandable mixture substantially filling the confining means. The confining means is capable upon heating of rupturing due to increased vapor pressure of liquid in the expandable mixture to permit the expandable material to rapidly expand and is constructed in such a manner that each of the cooperating surfaces remains substantially intact, that is, does not shatter.

The mixture of ingredients can be chosen from the many food bases known to the art. Useful mixtures include those based upon flour, that is, the meal of wheat or other grains, as well as those based upon flours derived from edible tubers, for example, potatoes, and having present all of the flavor characteristics of such edible tubers, such as the albumen, minerals, and fibrous material. It is preferable to use a mixture based upon starch-containing flour, such as one derived from potatoes, or upon rice, corn, tapioca, or the like.

The most preferred mixtures of ingredients are soy flour, whole-grain wheat flour, and whole-grain rice flour or whole-grain corn-meal with non-fat milk, a vegetable oil, and modest amounts of protein enhancers such as beaten eggs, seafood, fowl, strips of lean meat, or the like. In addition, flavor enhancers such as, for example, an extract such as almond extract, or condiments such as, for example, curry, may be added. Liquor or liquor flavorants may also be added. Color enhancement may be achieved with natural or certified food colorings.

Nutritional or flavor enhancement may be achieved by adding vegetable, fruits, or nuts, in small pieces or in crushed or blended form. As a further nutritional enhancement, yeast may be added to the mixtures of ingredients. If live yeast and a small amount of raw sugar are used, the internal pressure in the confining means will rise after sealing. Therefore, the resulting end product will have both greater nutritional value and greater expansion due to the additional pressure than would be achieved without the live yeast.

The mixture of ingredients will be moist and will contain from about 5 to 50% by weight of water, preferably from about 10 to 30% by weight, based on the total weight of the mixture of ingredient.

The mixture of ingredients is inserted or injected into, and then heated in, confining means which are manufactured for this purpose or are otherwise not naturally intended to be used in this manner. The confining means can be edible or inedible and can be comprised of, for example, a metal, preferably aluminum, ceramic material, or thermosettable polymer material, that has an initial yield point of about 650° F. or higher. In addition, the confining means can be comprised of protein-containing, naturally occurring or manufactured, substances such as bread crust, nut or fruit shell material, or the like. The confining means will preferably have a parting line or seam where two or more edges have been joined by a frangible material or points of weakness resulting from, for example, scoring.

The ingredients in their sealed confining means may be stored in frozen, refrigerated, or room temperature environments, dependent upon the storage qualities of the ingredients chosen.

The energy provided to the apparatus according to the invention can be focused or unfocused, coherent or incoherent, pulsed or continuous wave, radiant energy or flow of electric current. The energy source can be within the confining means and can be chemical in nature, for example, fuel and oxidizer in one molecular form or in separate molecular forms. An example of the latter is $H_2$ plus $O_2$. Combustion could be initiated by any of many ways, such as by a hot current-carrying wire. Energy cost can be kept low by using energy focused on ingredients or by using an energy source within the strong containing means. The expanded food product can be prepared very quickly by using an internal fuel and oxidizer.

The confining means can be structured so that the opening resulting from the bursting action will have a particular shape and will in turn impart a particular shape to the expanded ingredients which will pass through the opening.

A preferred method of imparting energy to the confining means is to heat the confining means either in an oven or on a heated surface, such as a hot plate. In a preferred mode, the confining means would be inserted into an oven preheated to from about 300° to 450° F. and heated at that temperature for from about 10 to 30 seconds, until bursting occurs.

The ingredients for the mixture of ingredients can be chosen according to the properties to be imparted to the end product and according to the desired time to bursting. For example, various colors, flavors, and textures can be imparted. The ingredients may also be chosen so that the final product will have an expansion ratio of from about 1.5:1 to about 50:1, preferably from about 2:1 to 10:1.

The ingredients may also comprise food supplements, such as protein additives, or medicinal components, such as those intended to assist in gaining or losing weight. Careful choosing of ingredients in combination with the dehiscent means of this invention will satisfy hunger using a modest volume of ingredients.

In the event that the products of this invention are intended to be used in microwave ovens, or similar such heating systems, the confining means, receiving means, etc., should be comprised of materials compatible with such use, that is, they should not be totally comprised of materials that would reflect the microwave radiation. For example, aluminum or other metallic materials should not be used exclusively. Preferably confining means intended for use in a microwave oven would have an opening, or "window", comprised of a material that is heat resistant and which allows microwave radiation to pass through, such as pyrex glass.

The invention described above is directed primarily to a product that will burst when the internal pressure is sufficient to cause the ingredients to burst from the confining means. It is also within the scope of this invention that during heating the confining means might, in certain applications, be scored by mechanical or chemical means to cause bursting at a particular time or temperature. Such bursting could be effected by, for example, a short burst of a laser beam. Such controlled bursting could be effected in a certain shape to cause the expanded contents to have a particular shape or configuration.

To perhaps better appreciate the invention, reference can be made to the embodiments of the invention represented by the drawings. In FIG. 1, a lower portion 1 of the confining means is attached to a base 2 so the confining means may rest on a flat surface, such as the bottom of an oven. A reciprocally fitting upper portion of the confining means 3 abuts lower portion 1 at the joint or parting line 4, and the two portions 1 and 3 are joined together by frangible sealing material 5, which may extend somewhat above parting line 4. The frangible sealing material 5 has been applied, inserted, or poured into crevice or trough 9, which is formed by the lower outer surface of upper portion 3 and the upward extending section 1' of lower portion 1.

Suitable mixed ingredients 8 are contained within the sealed confining means. Normally the mixed ingredients fill the confining means as much as possible. When the confining means is heated, the vapor pressures of water vapor and other gases from the heated ingredients 8 increase until the seal 5 breaks or bursts at line 4, upper portion 3 separates from lower portion 1, and the mixed ingredients 8 suddenly expand away from lower portion 1.

The expanded mixed ingredients may be sufficiently self-cohesive that the expanded mixed ingredients will be a one-piece product. However, the expanded product may be insufficiently self-cohesive or particulate.

The confining means may optionally have a receiving means or canopy 6 attached to the lower portion 1 by either chemical or mechanical means. The receiving means may comprise a pleated, expanded means that encompasses the circumference of lower portion 1. Mechanical fastening or adhesive applied to the pleats in bands 7 at the top and bottom of the receiving means 6 provides for a circular shape.

In another embodiment of the invention, not shown, the confining means, that is, portions 1 and 3, may be surrounded by, or contained in, a receiving means 6. For example, the receiving means 6 may comprise a collapsed or otherwise evacuated expandable means. The receiving means 6 could also comprise a rubber, bag-like means from which air has been removed and which is large enough to permit expansion of the expandable mixed ingredients.

The receiving means 6 may be comprised of edible or inedible material. Edible material would include, for example, bread or pastry crust and the like. Inedible materials would include, for example, metals, ceramic materials, or polymeric materials.

The frangible sealing material 5 can be any suitable, non-toxic material that will join the lower and upper portions of the confining means and will burst when the mixed ingredients are sufficiently heated. Suitable sealing materials include polymeric materials that will begin to yield at about 455° F. or higher. An example of such a sealing material is an anaerobic polymer material known as Loctite® (available from Loctite Corp., Newington, Conn.). However, when Loctite® is used, an annular rubber seal should preferably be placed between the mixture of ingredients and the Loctite®.

In addition, sealing may be effected in a two-stage manner. The lower and upper portions of the confining means may be joined by an epoxy material and then a more temperature-resistant material such as a silicone or polysilicone material may be applied on top of the epoxy material.

Further, mechanical means can be used to augment the sealing strength. If, for example, the confining means is comprised of a metal, the upper edge of the metal can be bent or deformed inwardly. More specifically, the upper edge may contain castellations which may then be bent inwardly to frangibly strengthen the sealing means.

The frangible sealing material 5 may preferably extend from about 0.25 to 1.0 inches above the parting line.

Figure 2:
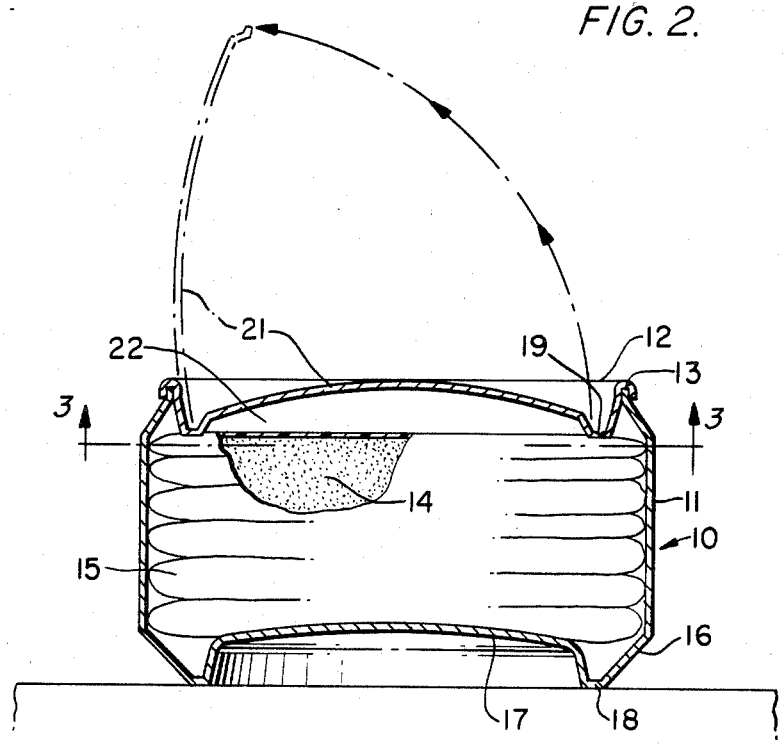
FIG. 2 represents a cross-sectional view of another embodiment of the invention.
Figure 3:
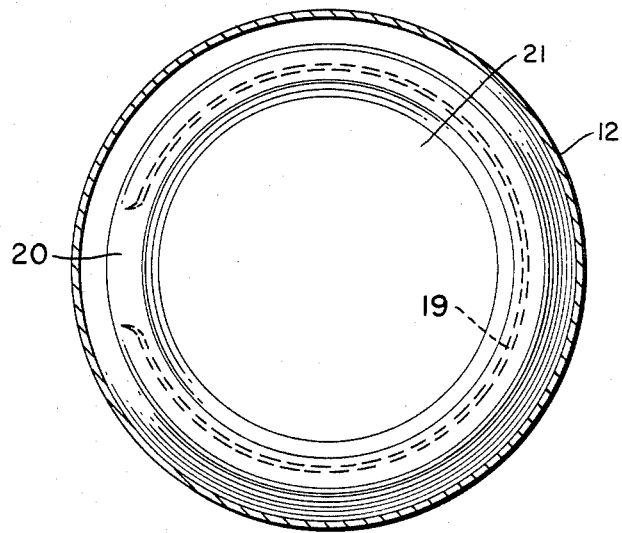
FIG. 3 represents an upward, sectional view of the top portion of the embodiment portrayed in FIG. 2.

The embodiment of the invention represented by FIGS. 2 and 3 operates on the same principles as the embodiment shown in FIG. 1 but has an entirely different configuration. The confining means 10 consists of lower portion 11 and upper portion 12, which are joined or crimped together at joint 13. Lower portion 11 contains a sufficient amount of a moist mixture of ingredients 14, which mixture is encased in a collapsed plastic bag 15 made of a suitable plastic material. Joint 13 may contain a suitable high-temperature sealant.

The bottom surface 16 of lower portion 11 can be flat or, as shown, have a recess 17, preferably a dome-shaped recess. If there is a recess such as recess 17, then the bottom surface 16 should be arranged in such a manner that air in the recess can escape as the device according to the invention is heated. For example, if recess 17 is bounded by annular ring 18, then annular ring 18 should have notches or other discontinuities (not shown) which permit air to escape.

Upper portion 12 has at least one score line 19. The score line 19 is circular but is discontinuous in hinge means or area 20. The discontinuity comprises from about 3 to 35 percent, preferably from about 5 to 15 percent, based upon the length of the score line. The score line 19 can be located on either the exterior or interior surface of the confining means; however, preferably the score line is located on the exterior surface, as shown in FIG. 2.

With regard to the configuration or embodiment of the invention represented in FIGS. 2 and 3, where, due to heating, the vapor pressure inside confining means 10 exceeds the yield strength in the upper portion 12 at the score line 19, the material yields at score line 19, allowing the middle 21 of the upper portion 12 to pivot on hinge means 20 and to assume a virtually vertical position. As this happens, the mixture 14 expands, and mixture 14 and the bag 15 expand out through opening 22. In view of the use of score line 19 and hinge means 20, it can be understood that the embodiment depicted in FIGS. 2 and 3 is effectively a one-time container, that is, it is not intended to be re-usable.

Figure 4:
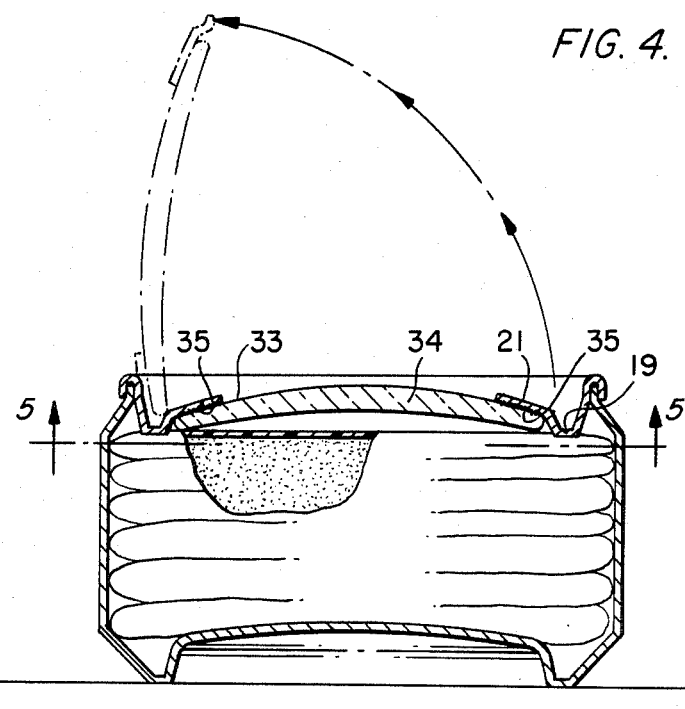
FIG. 4 represents a cross-sectional view of a variation of the embodiment represented by FIG. 2.
Figure 5:
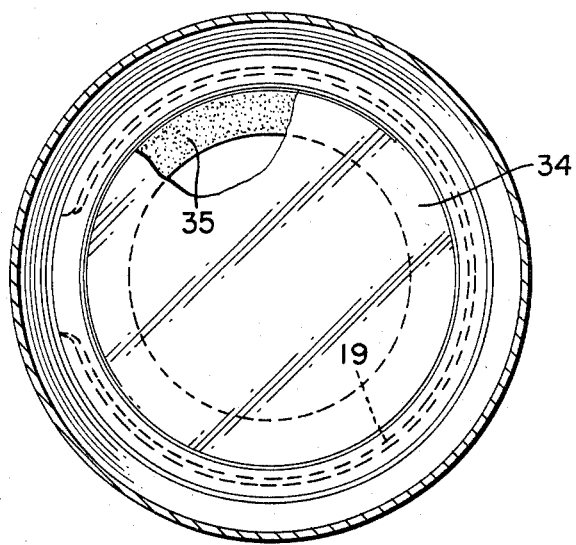
FIG. 5 represents an upward, sectional view of the top portion of the embodiment portrayed in FIG. 4.

FIGS. 4 and 5 depict a modification of the embodiment shown in FIGS. 2 and 3 wherein in upper portion 12 the middle 21 has an opening 33, preferably circular, and a corresponding piece 34 is affixed to the interior side of middle 21 by an annular arrangement of suitable affixing means 35, such as a high-temperature adhesive/sealant or some other pressure and heat resistant material or configuration. Corresponding piece 34, which is intended to be slightly larger than opening 33 and thus overlaps the interior side of said opening, is comprised of a suitable high-temperature and pressure resistant material that will permit the passage of microwave energy. Such material may be, for example, ovenproof glass such as pyrex or a suitable polymeric material that will facilitate the passage of a wide range of electromagnetic energy, such as that supplied in a microwave oven.

Figure 6:
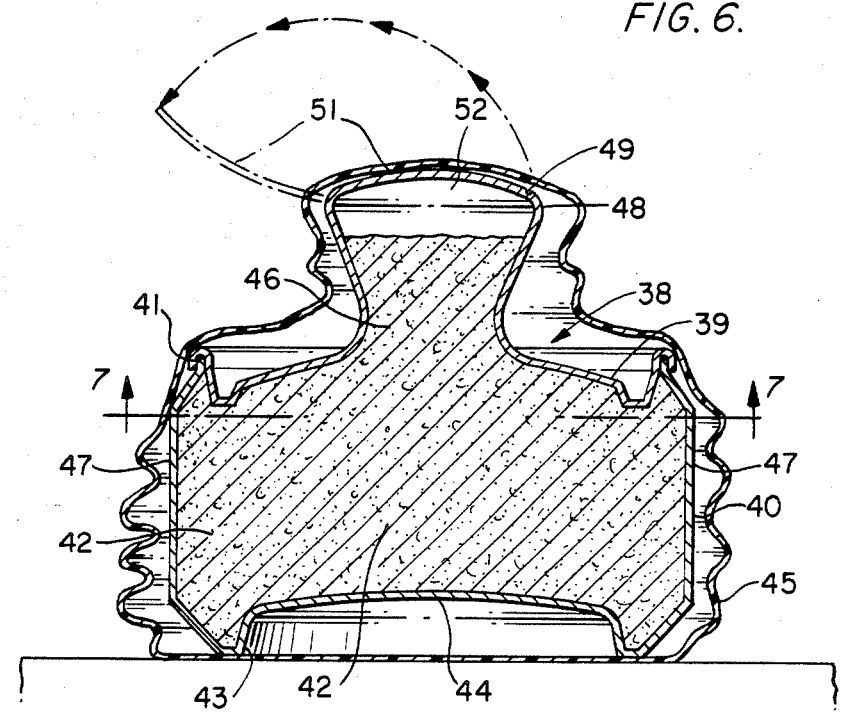
FIG. 6 represents a cross-sectional view of yet another embodiment of the invention.
Figure 7:
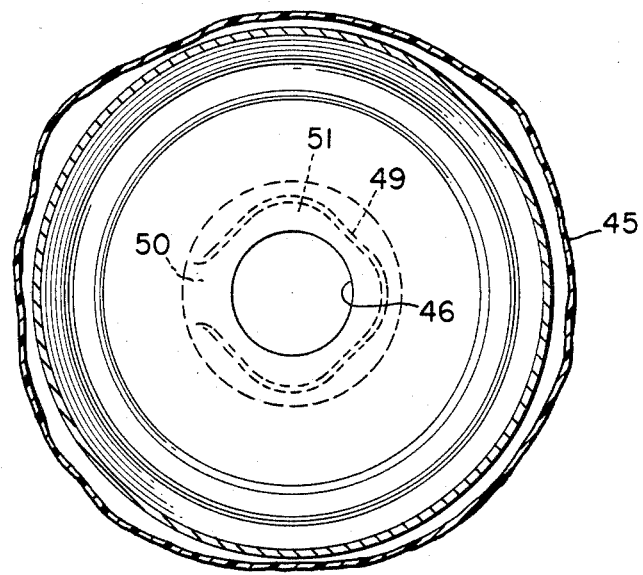
FIG. 7 represents an upward, sectional view of the top portion of the embodiment portrayed in FIG. 6.

FIGS. 6 and 7 represent another embodiment of the invention that operates on the same basic principle as above. The confining means 38 consists of upper portion 39 and lower portion 40, which are joined or crimped together at joint 41. The confining means 38 contains a sufficient amount, that is, from about 65 to 100 percent by volume, preferably from about 75 to 90 percent by volume, based upon the interior volume of the confining means, of a mixture of ingredients 42. Joint 41 may contain a suitable high temperature sealant.

The bottom surface 43 of the lower portion 40 preferably has a dome-shaped recess 44. Moreover, the entire confining means 38 may be contained in a collapsed plastic bag 45 comprised of a suitable high-temperature resistant material. Such a bag 45 may be what is commonly referred to as an "oven" bag or an "oven-proof" bag.

Upper portion 39 narrows to throat 46, the cross-sectional area of throat 46 being about 10 to 25 percent, preferably from about 15 to 20 percent, of the cross-sectional area within the lateral boundaries 47 of lower portion 40. Upper portion 39 then expands to top portion 48, which has at least one score line 49. Score line 49, which preferably is circular or otherwise substantially symmetrical in shape, is discontinuous at hinge means or area 50. As shown in FIG. 7, score line 49 is "wavy" to impart a certain shape to the expanded mixture. Preferably score line 49 is located on the exterior surface of the confining means 39.

When, upon heating, the vapor pressure inside confining means 38 exceeds the yield strength in the upper portion 39 at score line 49, the material yields at score line 49, permitting the middle 51 of the top-most surface of upper portion 39 to pivot at hinge area 50 and to assume an open, somewhat vertical position. Simultaneously the mixture 42 expands, or bursts, through opening 52 into bag 45.

It is within the scope of this invention that top portion 48 may contain a piece of pyrex glass or other suitable material in a fashion corresponding to the arrangement shown in FIGS. 4 and 5.

The particular dimensions of the individual embodiments do not seem to be critical. It is envisioned that in practice each embodiment may be from 0.5 to 10 inches wide and from 0.5 to 6 inches high. However, as long as the principles discussed above are employed, the embodiments of the invention may be virtually any size.

The following examples are intended to illustrate the invention and are not intended to limit the invention thereto.

EXAMPLES

EXAMPLE 1

A composition known as Beignet Mix (commercially available from Cafe du Monde, New Orleans, La.) which consists of flour, dry milk solids, sugar, vegetable shortening, salt, dried egg white, leavening, and vanilla, was used. The ingredients were stirred with ice water to make a runny mix. The confining means comprised two reciprocally fitting pieces of aluminum, each having a wooden nozzle insert, and an aluminum foil expandable receiving means was affixed to the outer portion of the confining means. The confining means was rinsed with avocado oil and then each reciprocally fitting piece was filled with runny mix.

The complete sample was kept chilled at 40° F. for several hours and then placed in an oven preheated to 525° F. Bursting occurred in about four minutes.

The resulting expanded material had a volume of about 1.7 times that of the original ingredients, as determined by comparing exterior measurements. Part of the expanded food had a swirl shape and the other part had a corkscrew shape.

Self-adhesiveness was highly satisfactory. The food could be picked up and eaten. Countless non-connected small bubbles and voids were visible to the unaided eye and helped to provide a pleasing texture for eating. The expanded food had an ivory color and a vanilla flavor.

EXAMPLE 2

A mixture of ingredients as in Example 1 was used, with the exception that a small amount, about two drops for 4 oz. of mixture, of red food coloring was added to yield a pink runny mix. The lower portion, or piece, of the confining means was fitted with a nozzle having two canted grooves.

A filled container was chilled as above and then placed in an oven preheated to about 525° F. Bursting occurred in about nine minutes. The longer period of time, as compared to Example 1, was believed due to the fact that the aluminum confining means used in this Example had a double aluminum canopy which acted as a partial heat barrier.

The expanded food product had a swirl shape and approximately the same expansion ratio as the product of Example 1.

EXAMPLE 3

Three bases were glued to three tube sections using a cyanoacrylate ester glue known as Super Glue 3 ®. The bases were comprised of aluminum and had a square shape approximately 13 mm square. The tube sections, also comprised of aluminum, were 10 mm high and had an inside diameter of 6 mm. The first sample was filled entirely, i.e., no air gap, with a mixture comprised of corn starch, distilled water, and red food coloring. The second sample was filled with a mixture comprised of corn starch, distilled water, green food coloring, and liquid peppermint flavoring. The third sample was filled with a mixture comprised of whole wheat flour, sugar, distilled water, and a coffee liqueur known as Kahlua Liqueur. The second and third samples each contained a 0.2 mm air gap at the top of the tube.

In each sample a saucer-shaped top was glued on the top of the tube section using a cyanoacrylate ester glue known as Krazy Glue ®. The tops were comprised of one layer of aluminum foil and another, top layer consisting of two strips of foil separated by a gap of about 0.6 to 1.2 mm. The two layers were glued together.

The three samples were heated in an electric popcorn popper containing 3 tablespoons of Safflower oil. In all three cases, the tube section parted from the base in about 5 to 7 seconds.

The expanded contents of Sample 1 were about 2.1 times the original volume, the expanded contents of Sample 2 were about 2 times the original volume, and the expanded contents of Sample 3 were about 1.1 times the original volume, as determined by comparing external measurements.

The preceding specific embodiments are illustrative of the practice of the invention. It is to be understood, however, that other expedients known to those skilled in the art or disclosed herein may be employed without departing from the spirit of the invention or the scope of the appended claims.

I claim:

1. A process for preparing an expanded food product which comprises providing a mercantile container and structuring said container to include on its surface a pre-designated area that is self-rupturable due to internal pressure sufficient to rupture said area, filling said container with a water-containing, edible, expandable mixture, and heating said mixture-containing container, said mixture containing sufficient water and said heating being at a sufficient temperature for a sufficient length of time to cause the vapor pressure of water in the expandable mixture to increase sufficiently to cause the confining means to spontaneously self-rupture in the pre-designated area and cause the expandable mixture to burstingly expand through the ruptured area to produce a substantially intact, expanded product.

2. The process of claim 1, wherein said container comprises two or more cooperating surfaces joined together by a frangible material, the area where said surfaces join together comprising said self-rupturable pre-designated area.

3. The process of claim 2, wherein said container comprises two cooperating surfaces.

4. The process of claim 1, wherein said container is contained within a means which will receive or contain the expanded material.

5. The process of claim 1, wherein said container is comprised of edible or non-edible polymeric material, metal, or ceramic.

6. The process of claim 5, wherein said container is comprised of protein and food supplements.

7. The process of claim 1, wherein the expandable mixture contains from about 5 to 50 percent by weight of water.

8. The process of claim 1, wherein said self-rupturable pre-designated area comprises at least one score line.

9. The process of claim 1, wherein the expandable mixture is contained within a collapsed bag comprised of heat-resistant material.

10. The process of claim 1, wherein the expandable mixture contains starch.

11. The process of claim 10, wherein the expandable mixture contains a starch-containing flour.

12. The process of claim 1, wherein said container is heated at from about 250° to 450° F.

13. The process of claim 1, wherein the volume of the expanded product is from about 1.1 to 50 times that of the expandable mixture.

* * * * *

UNITED STATES PATENT AND TRADEMARK OFFICE
CERTIFICATE OF CORRECTION

PATENT NO. : 4,525,367
DATED : June 25, 1985
INVENTOR(S) : George E. Allison

It is certified that error appears in the above-identified patent and that said Letters Patent is hereby corrected as shown below:

Column 8, lines 11 and 12 of Claim 1, "the confining means" should read -- said container --.

Signed and Sealed this

Twenty-ninth Day of October 1985

[SEAL]

Attest:

Attesting Officer

DONALD J. QUIGG

Commissioner of Patents and Trademarks—Designate